United States Patent
Engel et al.

(10) Patent No.: US 7,624,339 B1
(45) Date of Patent: Nov. 24, 2009

(54) DATA DISPLAY FOR MULTIPLE LAYERED SCREENS

(75) Inventors: Gabriel Daemon Engel, Hamilton (NZ); Pita Witehira, Hamilton (NZ)

(73) Assignee: Puredepth Limited, Auckland (NZ)

( * ) Notice: Subject to any disclaimer, the term of this patent is extended or adjusted under 35 U.S.C. 154(b) by 590 days.

(21) Appl. No.: 10/049,271

(22) PCT Filed: Aug. 18, 2000

(86) PCT No.: PCT/NZ00/00162

§ 371 (c)(1),
(2), (4) Date: Feb. 6, 2002

(87) PCT Pub. No.: WO01/15128

PCT Pub. Date: Mar. 1, 2001

(30) Foreign Application Priority Data

Aug. 19, 1999 (NZ) ........................ 337333

(51) Int. Cl.
*G06F 17/00* (2006.01)
(52) U.S. Cl. .................. 715/214; 715/212; 715/217; 715/243; 715/273
(58) Field of Classification Search ............. 715/500, 715/503, 504, 517, 526, 200, 212, 214, 217, 715/243, 273
See application file for complete search history.

(56) References Cited

U.S. PATENT DOCUMENTS

| | | | |
|---|---|---|---|
| 3,863,246 A | 1/1975 | Trcka et al. | |
| 4,239,349 A | 12/1980 | Scheffer | |
| 4,294,516 A | 10/1981 | Brooks | |
| 4,333,715 A | 6/1982 | Brooks | |
| 4,371,870 A | 2/1983 | Biferno | |
| 4,423,929 A * | 1/1984 | Gomi | 349/83 |
| 4,443,062 A * | 4/1984 | Togashi et al. | 349/83 |
| 4,472,737 A * | 9/1984 | Iwasaki | 348/51 |
| 4,523,848 A | 6/1985 | Gorman et al. | |
| 4,556,286 A * | 12/1985 | Uchida et al. | 349/79 |
| 4,562,433 A | 12/1985 | Biferno | |
| 4,568,928 A | 2/1986 | Biferno | |
| 4,648,691 A | 3/1987 | Oguchi et al. | |
| 4,649,425 A | 3/1987 | Pund | |
| 4,712,869 A | 12/1987 | Claxton | |
| 4,768,300 A | 9/1988 | Rutili | |
| 4,927,240 A * | 5/1990 | Stolov et al. | 349/81 |

(Continued)

FOREIGN PATENT DOCUMENTS

AU     82482/98     9/1998

(Continued)

OTHER PUBLICATIONS

Courter et al., Microsoft Office 200 Professional Edition, 1999, Sybex Inc., pp. xxxi, 543.*

(Continued)

*Primary Examiner*—Stephen S Hong
*Assistant Examiner*—Gregory J Vaughn

(57) ABSTRACT

A method of displaying data on a multilevel screen display is disclosed. The method comprises assigning screen designation codes to respective groups of data, and determining the physical screen on which each group of data is displayed. The screens may comprise layered liquid crystal displays. The method is suitable for use with spreadsheet software, where a user is able to see overlaying spreadsheets simultaneously.

43 Claims, 3 Drawing Sheets

U.S. PATENT DOCUMENTS

| | | | |
|---|---|---|---|
| 4,947,257 A | | 8/1990 | Fernandez et al. |
| 5,049,870 A | * | 9/1991 | Fitzgerald et al. ....... 340/815.55 |
| 5,091,720 A | | 2/1992 | Wood |
| 5,112,121 A | | 5/1992 | Chang et al. |
| 5,113,272 A | * | 5/1992 | Reamey ..................... 349/78 |
| 5,124,803 A | | 6/1992 | Troxel |
| 5,198,936 A | | 3/1993 | Stringfellow |
| 5,255,028 A | | 10/1993 | Biles |
| 5,255,356 A | | 10/1993 | Michelman et al. ......... 395/148 |
| 5,283,560 A | | 2/1994 | Bartlett |
| 5,289,297 A | | 2/1994 | Bollman et al. |
| 5,317,686 A | * | 5/1994 | Salas et al. ................. 715/503 |
| 5,333,255 A | | 7/1994 | Damouth |
| 5,361,165 A | | 11/1994 | Stringfellow et al. |
| 5,367,801 A | * | 11/1994 | Ahn ............................ 40/714 |
| 5,396,429 A | | 3/1995 | Hanchett |
| 5,416,890 A | | 5/1995 | Beretta |
| 5,416,895 A | * | 5/1995 | Anderson et al. ........... 715/503 |
| 5,418,898 A | * | 5/1995 | Zand et al. .................. 715/503 |
| 5,463,724 A | * | 10/1995 | Anderson et al. ........... 715/503 |
| 5,465,101 A | | 11/1995 | Akiba et al. |
| 5,473,344 A | | 12/1995 | Bacon et al. |
| 5,475,812 A | | 12/1995 | Corona et al. |
| 5,479,185 A | * | 12/1995 | Biverot ......................... 345/6 |
| 5,502,805 A | * | 3/1996 | Anderson et al. ........... 715/503 |
| 5,585,821 A | | 12/1996 | Ishikura et al. |
| 5,590,259 A | * | 12/1996 | Anderson et al. ........... 715/503 |
| 5,600,462 A | | 2/1997 | Suzuki et al. |
| 5,600,765 A | | 2/1997 | Ando et al. |
| 5,604,854 A | * | 2/1997 | Glassey ...................... 715/503 |
| 5,623,591 A | * | 4/1997 | Cseri .......................... 715/762 |
| 5,638,501 A | | 6/1997 | Gough et al. |
| 5,651,107 A | | 7/1997 | Frank et al. |
| 5,663,746 A | | 9/1997 | Pellenberg et al. |
| 5,664,127 A | * | 9/1997 | Anderson et al. ........... 715/776 |
| 5,675,755 A | | 10/1997 | Trueblood |
| 5,694,150 A | | 12/1997 | Sigona et al. |
| 5,694,532 A | | 12/1997 | Carey et al. |
| 5,695,346 A | | 12/1997 | Sekiguchi et al. |
| 5,721,847 A | * | 2/1998 | Johnson ..................... 715/786 |
| 5,729,219 A | | 3/1998 | Armstrong et al. |
| 5,757,522 A | * | 5/1998 | Kulick et al. ................. 359/9 |
| 5,764,317 A | * | 6/1998 | Sadovnik et al. ............ 349/5 |
| 5,772,446 A | | 6/1998 | Rosen |
| 5,796,455 A | | 8/1998 | Mizobata et al. |
| 5,805,163 A | | 9/1998 | Bagnas |
| 5,813,742 A | | 9/1998 | Gold et al. |
| 5,825,436 A | | 10/1998 | Knight |
| 5,828,420 A | | 10/1998 | Marshall et al. |
| 5,831,615 A | | 11/1998 | Drews et al. |
| 5,835,088 A | | 11/1998 | Jaaskelainen, Jr. |
| 5,880,742 A | * | 3/1999 | Rao et al. .................... 345/440 |
| 5,883,623 A | * | 3/1999 | Cseri .......................... 715/866 |
| 5,883,627 A | | 3/1999 | Pleyer |
| 5,883,635 A | * | 3/1999 | Rao et al. .................... 345/440 |
| 5,890,174 A | | 3/1999 | Khanna et al. .............. 707/504 |
| 5,923,307 A | | 7/1999 | Hogle, IV |
| 5,924,870 A | | 7/1999 | Brosh et al. |
| 5,963,197 A | | 10/1999 | Bacon et al. |
| 5,999,191 A | | 12/1999 | Frank et al. |
| 6,005,654 A | | 12/1999 | Kipfer et al. |
| 6,016,385 A | | 1/2000 | Yee et al. |
| 6,018,379 A | | 1/2000 | Mizobata et al. |
| 6,031,530 A | | 2/2000 | Trueblood |
| 6,037,937 A | | 3/2000 | Beaton et al. |
| 6,057,814 A | * | 5/2000 | Kalt ............................ 345/58 |
| 6,061,110 A | | 5/2000 | Hisatake et al. |
| 6,072,489 A | | 6/2000 | Gough et al. |
| 6,075,531 A | | 6/2000 | DeStefano |
| 6,085,202 A | * | 7/2000 | Rao et al. .................... 715/509 |
| 6,097,361 A | | 8/2000 | Rohner |
| 6,100,862 A | | 8/2000 | Sullivan |
| 6,111,614 A | | 8/2000 | Mugura et al. |
| 6,118,427 A | | 9/2000 | Buxton et al. |
| 6,163,318 A | | 12/2000 | Fukuda et al. |
| 6,181,349 B1 | | 1/2001 | Bardon et al. |
| 6,204,902 B1 | | 3/2001 | Kim et al. |
| 6,215,490 B1 | | 4/2001 | Kaply |
| 6,215,898 B1 | * | 4/2001 | Woodfill et al. ............. 382/154 |
| 6,239,852 B1 | | 5/2001 | Oono et al. |
| 6,246,407 B1 | | 6/2001 | Wilks et al. |
| 6,269,173 B1 | * | 7/2001 | Hsien ......................... 382/103 |
| 6,282,551 B1 | * | 8/2001 | Anderson et al. ........... 715/503 |
| 6,300,990 B1 | | 10/2001 | Yamaguchi et al. |
| 6,317,128 B1 | | 11/2001 | Harrison et al. |
| 6,327,592 B1 | * | 12/2001 | Yoshikawa .................. 707/101 |
| 6,341,439 B1 | | 1/2002 | Lennerstad |
| 6,351,298 B1 | | 2/2002 | Mitsui et al. |
| 6,356,281 B1 | | 3/2002 | Isenman |
| 6,369,830 B1 | | 4/2002 | Brunner et al. |
| 6,377,229 B1 | | 4/2002 | Sullivan |
| 6,418,426 B1 | * | 7/2002 | Schlesinger .................... 707/2 |
| 6,438,515 B1 | | 8/2002 | Crawford et al. |
| 6,443,579 B1 | | 9/2002 | Myers |
| 6,466,185 B2 | | 10/2002 | Sullivan et al. |
| 6,468,157 B1 | | 10/2002 | Hinami et al. |
| 6,496,832 B2 | * | 12/2002 | Chi et al. .................... 707/102 |
| 6,505,209 B1 | * | 1/2003 | Gould et al. ................ 707/102 |
| 6,538,660 B1 | | 3/2003 | Celi, Jr. et al. |
| 6,587,094 B2 | | 7/2003 | Anderson |
| 6,587,118 B1 | | 7/2003 | Yoneda |
| 6,593,904 B1 | | 7/2003 | Marz et al. |
| 6,609,799 B1 | | 8/2003 | Myers |
| 6,610,102 B1 | * | 8/2003 | Aldred et al. ............... 715/509 |
| 6,661,425 B1 | | 12/2003 | Hiroaki |
| 6,693,692 B1 | | 2/2004 | Kaneko et al. |
| 6,721,713 B1 | * | 4/2004 | Guheen et al. ................. 705/1 |
| 6,725,422 B1 | * | 4/2004 | Bauchot et al. ............. 715/503 |
| 6,760,003 B1 | | 7/2004 | Sase |
| 6,771,327 B2 | | 8/2004 | Sekiguchi |
| 6,845,578 B1 | | 1/2005 | Lucas |
| 6,859,907 B1 | * | 2/2005 | McGarry .................... 715/503 |
| 2001/0026625 A1 | | 10/2001 | Azima et al. |
| 2002/0091728 A1 | * | 7/2002 | Kjaer et al. ................. 707/503 |
| 2002/0093516 A1 | | 7/2002 | Brunner et al. |
| 2002/0163728 A1 | | 11/2002 | Myers |
| 2002/0163729 A1 | | 11/2002 | Myers |
| 2003/0069074 A1 | | 4/2003 | Jackson |
| 2003/0132895 A1 | | 7/2003 | Berstis |
| 2003/0184665 A1 | | 10/2003 | Berstis |
| 2004/0239582 A1 | | 12/2004 | Seymour |

FOREIGN PATENT DOCUMENTS

| | | |
|---|---|---|
| AU | 24806/00 | 7/2000 |
| AU | 24538/00 | 8/2000 |
| AU | 68219/01 | 12/2001 |
| BE | 1011678 | 12/1999 |
| CA | 2009960 | 9/1990 |
| CA | 2075807 | 8/1991 |
| CA | 2139696 | 7/1995 |
| CA | 2320694 | 8/1999 |
| DE | 2730785 | 1/1979 |
| DE | 29912074 | 11/1999 |
| DE | 19920789 | 5/2000 |
| EP | 0389123 | 9/1990 |
| EP | 454423 | 10/1991 |
| EP | 454423 A * | 10/1991 |
| EP | 662669 | 1/1994 |
| EP | 595387 | 5/1994 |
| EP | 595387 A * | 5/1994 |
| EP | 0703563 | 3/1996 |
| EP | 0802684 | 10/1997 |
| EP | 0935191 | 8/1999 |

| | | |
|---|---|---|
| EP | 1057070 | 8/1999 |
| EP | 0999088 | 5/2000 |
| EP | 1151430 | 8/2000 |
| EP | 1177527 | 11/2000 |
| EP | 1093008 | 4/2001 |
| EP | 1287401 | 3/2003 |
| GB | 2145897 | 4/1985 |
| GB | 2245092 | 12/1991 |
| GB | 2312584 | 10/1997 |
| GB | 2347003 | 8/2000 |
| GB | 2372618 | 8/2002 |
| IL | 93472 | 11/1994 |
| JP | 3021902 | 1/1991 |
| JP | 3174580 | 7/1991 |
| JP | 09-282357 A * | 10/1991 |
| JP | 3226095 | 10/1991 |
| JP | 4191755 | 7/1992 |
| JP | 6274305 | 9/1994 |
| JP | 08-036375 A * | 2/1996 |
| JP | 8030388 | 2/1996 |
| JP | 8036375 | 2/1996 |
| JP | 8095741 | 4/1996 |
| JP | 09-033858 | 2/1997 |
| JP | 9282357 | 10/1997 |
| JP | 9308769 | 12/1997 |
| JP | 10003355 | 1/1998 |
| JP | 10039782 | 2/1998 |
| JP | 10039821 | 2/1998 |
| JP | 10105829 | 4/1998 |
| JP | 10228347 | 8/1998 |
| JP | 11205822 | 7/1999 |
| JP | 2000-142173 | 5/2000 |
| JP | 2000-347645 | 12/2000 |
| JP | 2001-215332 | 4/2002 |
| JP | 2002-350772 | 12/2002 |
| JP | 2002-099223 | 10/2003 |
| NL | 1005868 | 10/1997 |
| NO | 20005178 | 4/2001 |
| PL | 343229 | 4/2001 |
| WO | 91/12554 | 8/1991 |
| WO | 98/47106 | 10/1998 |
| WO | 99/42889 | 8/1999 |
| WO | 00/36578 | 6/2000 |
| WO | 00/48167 | 8/2000 |
| WO | PCT NZ00/00162 * | 8/2000 |
| WO | 00/68887 | 11/2000 |
| WO | 01/01290 | 1/2001 |
| WO | WO 01/15128 A1 * | 3/2001 |
| WO | 01/95019 | 12/2001 |
| WO | 02/084637 | 10/2002 |
| WO | 02/091033 | 11/2002 |
| WO | 03/003109 | 1/2003 |
| ZA | 9703025 | 11/1997 |

OTHER PUBLICATIONS

Courter et al., Microsoft Office 200 Professional Edition, 1999, Sybex Inc., pp. xxxi, 543, 685.*
Harrison et al., "Transparent Layered User Interfaces: An Evaluation of a Display Design to Enhance Focused and Divided Attention" ACM, 13 pages, 1995.
Ishii et al., "Iterative Design of Seamless Collaboration Media", Communications of the ACM, Aug. 1994, vol. 37, pp. 83-97.
Office Action U.S. Appl. No. 10/048,638, filed Jun. 6, 2007.
Office Action U.S. Appl. No. 10/048,638, filed Jun. 26, 2006.
Office Action U.S. Appl. No. 10/048,638, filed Sep. 30, 2004.
Office Action U.S. Appl. No. 10/048,638, filed Oct. 17, 2005.
Office Action U.S. Appl. No. 10/048,638, filed Nov. 27, 2007.
Office Action U.S. Appl. No. 10/048,966, filed Jan. 12, 2006.
Office Action U.S. Appl. No. 10/048,966, filed Jan. 27, 2005.
Office Action U.S. Appl. No. 10/048,966, filed Mar. 15, 2006.
Office Action U.S. Appl. No. 10/048,966, filed May 2, 2007.
Office Action U.S. Appl. No. 10/048,966, filed May 3, 2006.
Office Action U.S. Appl. No. 10/048,966, filed Jul. 14, 2005.
Office Action U.S. Appl. No. 10/048,966, filed Aug. 18, 2006.
Office Action U.S. Appl. No. 10/049,272, filed Jan. 23, 2006.
Office Action U.S. Appl. No. 10/049,272, filed Mar. 25, 2008.
Office Action U.S. Appl. No. 10/049,272, filed May 21, 2007.
Office Action U.S. Appl. No. 10/049,272, filed Jul. 13, 2005.
Office Action U.S. Appl. No. 10/049,272, filed Jul. 26, 2004.
Office Action U.S. Appl. No. 10/049,272, filed Aug. 28, 2006.
Office Action U.S. Appl. No. 10/049,272, filed Oct. 12, 2007.
Office Action U.S. Appl. No. 10/049,272, filed Nov. 29, 2004.
Office Action U.S. Appl. No. 10/049,272, filed Dec. 14, 2007.
Office Action U.S. Appl. No. 10/049,272, filed Dec. 31, 2003.
Office Action U.S. Appl. No. 10/476,590, filed Mar. 3, 2006.
Office Action U.S. Appl. No. 10/476,590, filed Apr. 19, 2007.
Office Action U.S. Appl. No. 10/476,590, filed Oct. 6, 2006.
Office Action U.S. Appl. No. 10/476,590, filed Oct. 16, 2007.
Office Action U.S. Appl. No. 10/489,101, filed Mar. 29, 2006.
Office Action U.S. Appl. No. 10/489,101, filed Jul. 16, 2007.
Office Action U.S. Appl. No. 10/489,101, filed Jul. 28, 2005.
Office Action U.S. Appl. No. 10/489,101, filed Nov. 22, 2005.
USPTO Final Rejection Dated Dec. 24, 2008 for U.S. Appl. No. 10/049,272.
Office Action; 10/048,638; Mail Date Jun. 06, 2008.
Office Action; U.S. Appl. No. 10/048,966; Mail Date Sep. 18, 2007.
Office Action; U.S. Appl. No.10/049,272; Mail Date Aug. 13, 2008.
Office Action; U.S. Appl. No. 10/049,272; Mail Date Dec. 24, 2008.
Office Action; U.S. Appl. No. 10/476,590; Mail Date Feb. 28, 2008.
Office Action; U.S. Appl. No. 10/476,590; Mail Date Jun. 19, 2008.
Office Action; U.S. Appl. No. 10/476,590; Mail Date Oct. 29, 2008.
Office Action; U.S. Appl. No. 10/528,334; Mail Date Feb. 24, 2009.
Office Action; U.S. Appl. No. 10/528,334; Mail Date Aug. 5, 2008.
"Clearboard 1991-1994"; http://web.media.mit.edu/~ishii/CB.html. pp. 1-4.
"Teamworkstation 1989-1994"; http://web.media.mit.edu/~ishii/TWS/html. pp. 1-3.
"Textarc: An Alternate Way to View a Text"; http://textarc.org. p. 1.
"Textarc: Nysca Grant and Public Installation"; http//textarc.org. p. 1.
"Textarc: The Print and the Artist"; http://textarc.org. p. 1.
Final OA Dated Dec. 24, 2008; U.S. Appl. No. 10/049,272.
Final OA Dated Feb. 24, 2009; U.S. Appl. No. 10/528,334.
Final OA Dated Mar. 18, 2009; U.S. Appl. No. 10/048,966.
Final OA Dated Mar. 23, 2009; U.S. Appl. No. 10/476,590.
Non-Final Office Action Dated Aug. 14, 2009; U.S. Appl. No. 10/049,272.
Non-Final Office Action Dated Sep. 4, 2009; U.S. Appl. No. 10/476,590.
Non-Final Office Action Dated Sep. 1, 2009; U.S. Appl. No. 10/528,334.
Non-Final Office Action Dated Sep. 9, 2009; U.S. Appl. No. 10/557,157.
Non-Final Office Action Dated Aug. 12, 2009; U.S. Appl. No. 12/107,589.

* cited by examiner

Fig. 3

DATA DISPLAY FOR MULTIPLE LAYERED SCREENS

TECHNICAL FIELD

This invention relates to data display.

BACKGROUND ART

Reference throughout this specification shall be made to use of the present invention in relation to the display of data in spreadsheets. However, it should be appreciated that aspects of the present invention can be used in relation to displaying data presented in other formats, perhaps graphically or in some other format for displaying in particular relational data.

There are a number of spreadsheet programs, one of the more prolific being MICROSOFT EXCEL. These spreadsheet programs have a number of cells in rows and columns into which data can be input. Often the cells within the spreadsheet are related to each other.

For example, there may be a cell that displays a number which is calculated from the numbers represented in other cells in the spreadsheet. For instance, this particular cell may represent the total of a column of numbers. Any change to the numbers in that column will also be reflected in that cell representing the total.

This system works well when all of the data required to be reviewed can fit onto one computer screen display. However, often the user of the software creates spreadsheets which have more data entered into them than can be shown on one screen display at a time.

To accommodate this need, spreadsheet software often includes a facility akin to an old-fashioned system of having separate sheets of paper or cards except this is displayed on the computer, accessed by a virtual tab. For example, the screen may show one set of data. By clicking on a tab, a second set of data is then displayed on the screen with the first set of data being hidden by the second.

Unfortunately, this is still unsatisfactory. This is because the screen does not show all of the data that the user may wish to see. While the user can choose which spreadsheet to view, the user cannot see the effect that changing a cell on one spreadsheet has on another cell on the other spreadsheet.

Another problem is that it can take some time for a user to locate a particular cell. Not only is this another attempt to address the situation has been the ability to include multiple files on a screen which may be cross-linked in terms of having relational data. Thus, it is possible for the user to alter data on one part of the screen in relation to one file and see its effect on another part of the screen in relation to another file.

Unfortunately, these attempts are still unsatisfactory. One problem with this system is that although there may be inter-relational data, there is no physical feel of the relationship between the cells.

For example, on each spreadsheet there may be cells relating to similar data in the same columns and rows for each spreadsheet. However, positioning the spreadsheets beside each other on the screen does not provide an intuitive feel of the relationship of the cells to each other.

Another problem that occurs is that often the single cell has two lots of data assigned to it. One data element is the actual number and the other data element is the formula or relationship equation which generates that number. In traditional spreadsheet programs, the formula is usually only displayed when that particular cell is selected. Therefore, the formula for a number of related cells cannot be displayed at the same time. This is understandably frustrating, particularly when a person is desirous of quickly viewing and assessing the relationship between a number of cells to each other.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided a method for creating a visual effect in the display of software wherein the software is for the manipulation of data, the method characterised by the steps of a) assigning a particular screen designation code to a first group of data, and b) assigning other screen designation codes to second and other groups of data as desired, wherein the screen designation code determines which physical screen the group of data is displayed in a multi-level screen display.

As stated previously, the software in preferred embodiments is spreadsheet software, although it should be appreciated that the principles of the present invention can apply to other types of software, particularly those which relate to the display of data, such as databases, graphical analysis and so forth.

The term second and other group of data may cover such items as formula, relational information, highlights, error messages, hints and so forth which can be associated with the first group of data.

The screen designation code is merely a code that identifies which physical screen the image or software component is displayed upon.

The inventors of the present invention also invented a multi-level screen display and this is described in detail in PCT Application Nos. PCT/NZ98/00098 and PCT/NZ99/00021.

This is a device which is created by combining multiple layers of selectively transparent screens. Each screen is capable of showing an image. In preferred embodiments, the screen layers are liquid crystal displays. Preferably the screens are aligned parallel to each other with a preset distance between them.

With this invention, images displayed on the screen furthest from the view (background screen), will appear at some depth behind the images displayed on the screen closest to the viewer (foreground screen). The transparent portions on the foreground screen will allow viewers to see images displayed on the background screen.

This arrangement of layering multiple screens allows images to be presented at multiple levels giving the viewer true depth without use of glass or lens.

The present invention will now refer to use with a multi-level screen as described above although this should not be seen as limiting.

The group of data is in preferred embodiments a spreadsheet such as that normally viewed in a spreadsheet program, however this should not be seen as limiting.

It should be appreciated that although reference shall be made throughout this specification now to only background and foreground screens, other aspects of the present invention may utilise more than two screens. For example, various spreadsheets may be on the multiple screens behind the foreground screen.

A group of data may be that information displayed when a particular tab is selected on the screen. Therefore, that group of data or spreadsheet is displayed on one of the physical screens.

The group of data or spreadsheet that can be viewed by selecting another tab may be displayed on another physical screen. Alternatively, if there are two separate spreadsheet programs, these can be imported to an embodiment of the present invention and have separate spreadsheets from the separate files shown on the separate screens with one spreadsheet overlaying another, but with the ability to see both.

One embodiment of the present invention will be an interface that identifies the coding on existing software with these identifiers and assign various data groups to the appropriate foreground or background screen.

The 'always on top' functions can be made fully or partially transparent by the present invention.

In one embodiment of the present invention, one screen may have a highlight for a particular cell or group of cells positioned either in front of or behind that highlight. In a variation of this embodiment, the highlights of a number of cells may be colour coded with the codes corresponding to a particular relationship to cells of a certain type.

In another embodiment of the present invention, one group of data on one screen may be the actual values within the cells and the other group or groups of data on the other screens may be the coding or formulas or relational information that actually creates the value shown on the other screen.

In some embodiments, the groups of data may all belong to the same large spreadsheet and the second and consequent screens may merely show the wrap-around of that spreadsheet.

In other embodiments, it may be provided in cells a hyperlink that can take the user of the spreadsheet to other cells or other screens.

Sometimes, the present invention may be useful in error tracking. For example. a mistake in the relational formula between the cells or the data entered may lead to an error. The ability to see a number of cells at once can assist in tracking down where the error occurred or what cells are affected by the error.

In one aspect of the present invention there may be provided the ability to scroll through values on one cell or set of cells on a screen while still being able to view another set of cells on another screen. This is particularly useful where it is desired to be able to search for information or data on various areas of the spreadsheet or database while not disturbing the actual region of the spreadsheet or database that the user is working on.

The scrolling or rotation of data on various cells may be achieved in some instances by the use of a track ball or some other user interface.

In yet another embodiment one of the screens may display tips or hints associated with the cells being displayed on the other screen.

The interface may be a patch for existing software, a library file or a new front end for multiple existing software packages or a completely new operating system.

With existing software that does not have such coding, it may be necessary to implement the present invention by having customised software in which the software developer specifies the software routines which cause the appropriate components and images to go on the appropriate screens.

A further aspect of the present invention is the provision of media on to which instructions in accordance with the present invention has been recorded. For example. this media may be a graphics card, CD, hard drive, floppy disk and so forth.

The advantages of the present invention can now be readily seen.

Because of the physical separation between the screens, the viewer can easily see data on the front screen and on the rear screen as required. Thus, the user can see significantly more data than previously viewable with standard software or standard screens. Indeed the amount of data that the user can see is a multiple proportional to the number of screens in the multi-level screen display.

The viewer can instantly see on which screen holds the cell or data that is relevant to it and select this.

The user can also see at a glance the relational nature of the data on the screens. For example, a change on one screen may cause corresponding change on the other screen overlaying it. This gives an instant appreciation of the effect of a change.

In some embodiments of the present invention the cells which change as a consequence of altering data may be colour coded. This allows the user to more quickly identify where that change has occurred on multiple screens.

Some embodiments may have different shading to make it clear as to which screen the group of data is on, or to indicate which data is grouped together. The overall screens may also be shaded/coloured to give visual clarity.

The present invention also allows the user to easily access a desired cell. Not only is this more desirable for the user in terms of mental satisfaction, but this also is significant in terms of physical relief. A problem that frequent computer users have is occupational overuse syndrome (oos) which is the repeated use of muscles, particularly when typing or using a mouse. Easier access means that the mouse is used less in order to find a particular cell and thus a potentially unpleasant medical condition is avoided.

In some embodiments of the present invention some cells are presented as 3-dimensional blocks which can be selected, moved or removed like blocks in a wall to reveal data on other screens.

It can be appreciated that the present invention overall literally provides an added dimension to the ability of a user to work with data manipulation programs such as spreadsheets and databases. There is considerably more flexibility and also a reduction in the time and effort required by the user to see the relationship between groups of data to each other.

Aspects of the present invention may extend to other standard functions on a spreadsheet program.

For example, spreadsheet programs often come with the ability to present the data graphically. Thus, for multi-relational data sheets, the present invention can also be used to produce 3-dimensional graphs showing the data on x, y and z axes as required.

BRIEF DESCRIPTION OF DRAWINGS

Further aspects of the present invention will become apparent from the following description which is given by way of example only and with reference to the accompanying drawings in which:

FIG. 3 is a concept drawing showing the 3-dimensional nature of the present invention.

BEST MODES FOR CARRYING OUT THE INVENTION

Figure 1:
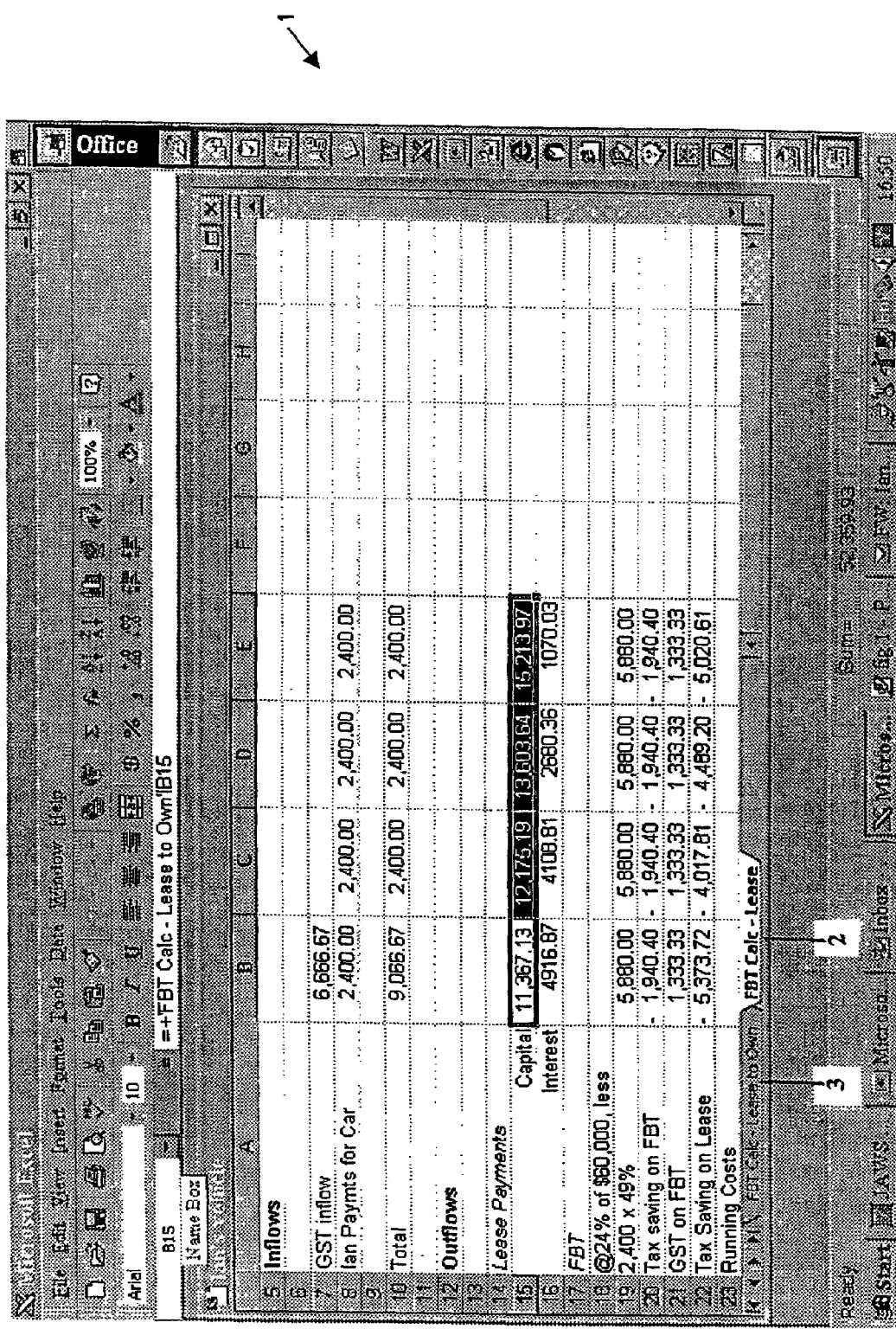
FIG. 1 illustrates a screen display of a prior art spreadsheet software.

FIG. 1 is a screen display from a MICROSOFT EXCEL program. This illustrates a group of data on a spreadsheet generally indicated by arrow 1 on the screen. The associated tab (2) indicates that the data we are looking at relates to "FBT Calc—Lease".

The screen also shows that there is a second group of data (not shown) and positioned visually under the first group of data. The indicator that there is a second group of data is the tab (3) which reads "FBT Calc—Lease to Own".

To view the second group of data, it is necessary to select the tab (3). However, in doing so the first group of data is obscured by the second group of data. Thus, the effect of a change on one group of data is not immediately discernable as the user cannot see the other group of data.

It can also be seen that it can be difficult for the user to select a particular cell given that half of the data is obscured at any one time.

It should also be appreciated that spreadsheet programs of this type have the ability to have multiple tabs, not just the two shown.

Figure 2:
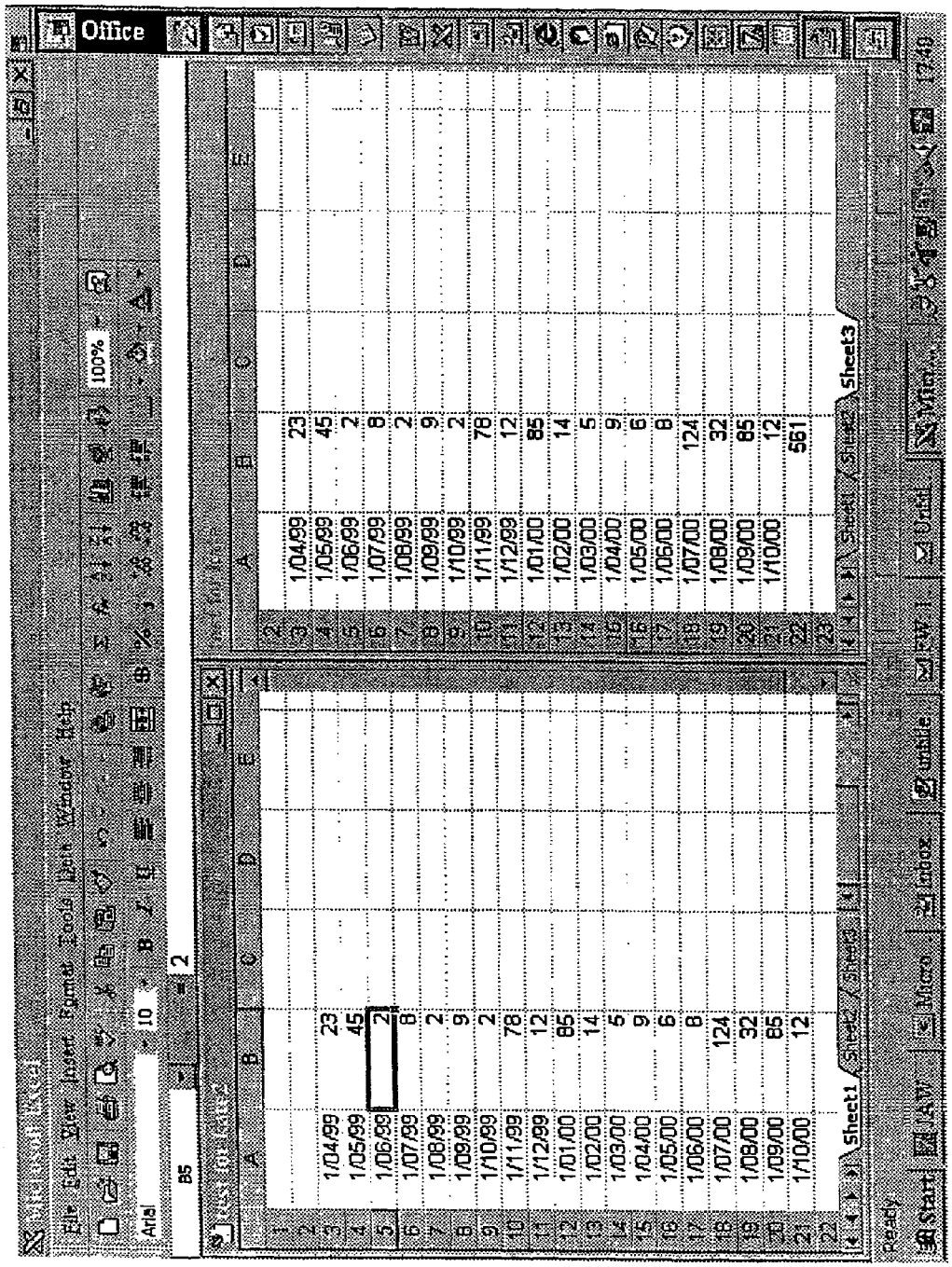
FIG. 2 illustrates another prior art screen display.

FIG. 2 illustrates a screen display whereby two separate files have been imported into the one screen display and are positioned side by side. This enables the user to change data on file and view its corresponding effect on the other file.

However, because the files are side by side, this is not intuitive with there being no real physical relationship between cells having the same common row and column. Further, the screen size is still limited and only a certain amount of data can be fitted onto the screen.

The present invention provides for the separate groups of data (whether from separate files of merely separate spreadsheets to be displayed on separate physical screens aligned with each other.

Figure 3:
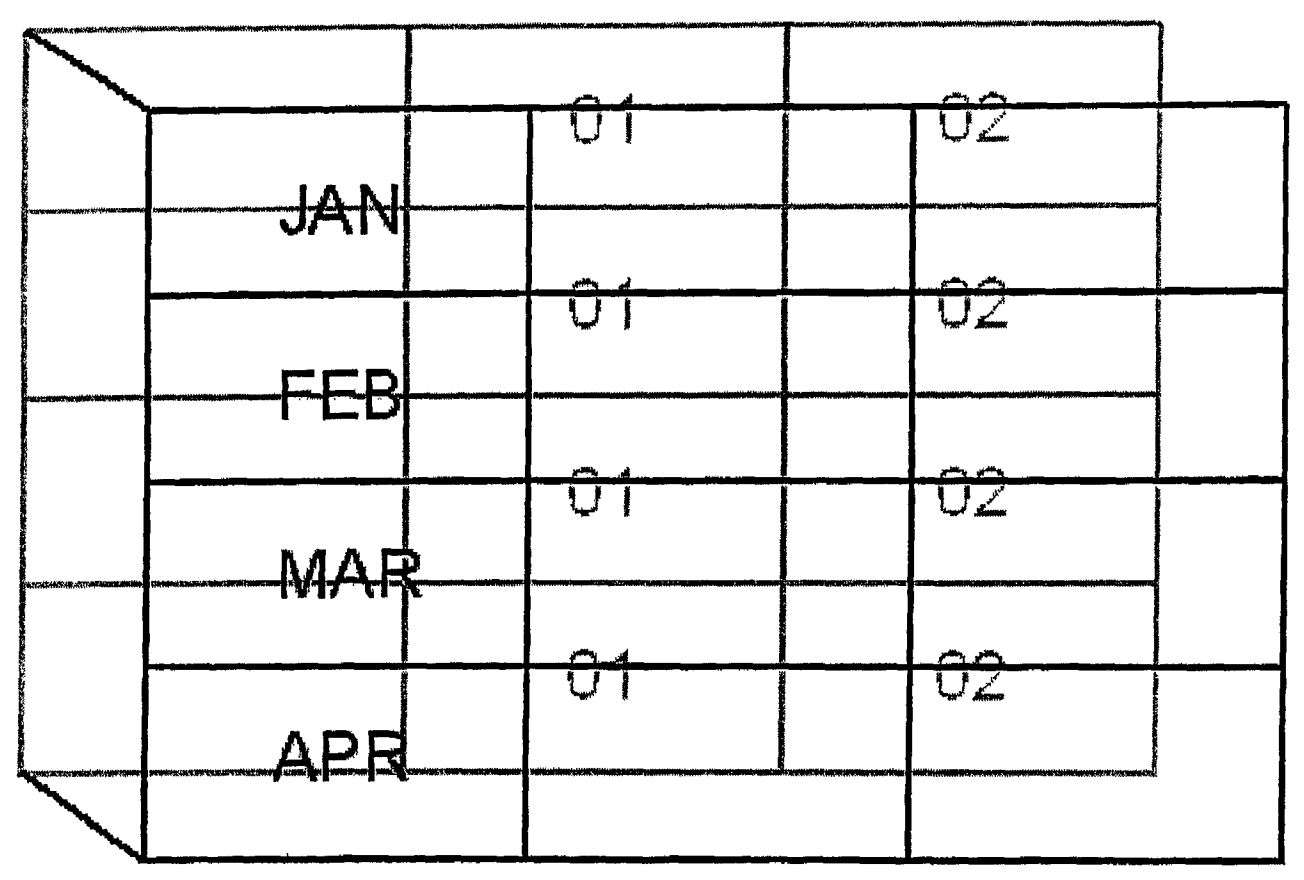

FIG. 3 shows an example of a multi-level spreadsheet using only 2 layers. Information can be stored on both layers. The layout of the cells can be used to enhance user information by positioning related cells close to or behind one another so as to improve the visual feedback to the user speeding up the development time and improving error detection. The positioning of the cells can also be used to increase the information available on a given cell as illustrated by the text and numbering chosen for FIG. 3. The front screen is ready to receive the monthly information such as income generated or expenses incurred while the back screen provides the user with immediate information about the day on which the income was generated or expense total incurred, thus reducing the need to look away from the cell to gain this information.

A greater number of layers of course can be used.

The 3-dimensional spreadsheet enables the user to see far greater quantities of data in the one visual display than before.

It also enables the user to quickly select a desired cell. Further, the relational nature of the data to each other can be intuitively perceived.

Aspects of the present invention have been described by way of example only and it should be appreciated that modifications and additions may be made thereto without departing from the scope of the appended claims.

The invention claimed is:

1. A method of displaying spreadsheet objects, said method comprising:

assigning a first screen designation code to a first portion of a spreadsheet object, said first screen designation code associated with a first display screen of a multi-component display;

assigning a second screen designation code to a second portion of said spreadsheet object, said second screen designation code associated with a second display screen of said multi-component display; and simultaneously displaying said first and second portions of said spreadsheet object in accordance with said first and second screen designation codes, wherein said simultaneously displaying further comprises simultaneously displaying said first and second portions of said spreadsheet object on a respective display screen of said first and second display screens, wherein said simultaneously displaying comprises generating said first and second portions of said spreadsheet object using at least one pixel of said first display screen and at least one pixel of said second display screen.

2. The method of claim 1, wherein said first and second portions of said spreadsheet object are selected from a group consisting of a window portion, menu portion, a tab portion, an icon portion, a user-modifiable field portion, a cell portion, and a grouping of cells.

3. The method of claim 1, wherein said first and second portions of said spreadsheet object are each associated with a respective user-selectable tab.

4. The method of claim 1, wherein said first portion of said spreadsheet object comprises a formula, and wherein said second portion of said spreadsheet object comprises at least one of data associated with said formula and a result of said formula.

5. The method of claim 1, wherein said first and second portions of said spreadsheet object comprise adjoining data wrapped from said first display screen to said second display screen.

6. The method of claim 1, wherein said first portion of said spreadsheet object comprises a first color and said second portion of said spreadsheet object comprises a second color.

7. The method of claim 1, wherein said first portion of said spreadsheet object displayed on said first display screen comprises a link to said second portion of said spreadsheet object displayed on said second display screen.

8. The method of claim 1, wherein said second portion of said spreadsheet object comprises at least one of an error message related to said first portion of said spreadsheet object and information about said first portion of said spreadsheet object.

9. The method of claim 1 further comprising:

in response to a user interaction, updating a position of said first portion of said spreadsheet object on said first display screen with respect to a position of said second portion of said spreadsheet object on said second display screen.

10. The method of claim 1, wherein at least one of said first and second portions of said spreadsheet object comprise an active cell, an active spreadsheet, and a user-selected cell.

11. The method of claim 1, wherein said first and second display screens are physically spaced apart from one another, and wherein said first display screen is positioned in front of said second display screen.

12. The method of claim 1 further comprising:

increasing the transparency of said first portion of said spreadsheet object to increase the visibility of said second spreadsheet object.

13. The method of claim 1, wherein said first portion of said spreadsheet object is associated with a first spreadsheet and said second portion of said spreadsheet object is associated with a second spreadsheet, and wherein said first and second spreadsheets overlap.

14. The method of claim 1 further comprising:
automatically modifying said second portion of said spreadsheet object in response to a modification of said first portion of said spreadsheet object.

15. The method of claim 14, wherein said automatically modifying said second portion of said spreadsheet object comprises changing a color of said second portion of said spreadsheet object.

16. The method of claim 1, wherein an overlap of said first and second portions of said spreadsheet object indicates a relationship of said first and second portions of said spreadsheet object.

17. The method of claim 1, wherein said first and second portions of said spreadsheet object comprise at least one of a three-dimensional graph, a three-dimensional chart, and a three-dimensional object.

18. The method of claim 1, wherein said first and second portions of said spreadsheet object are associated with a single spreadsheet cell.

19. The method of claim 1 further comprising:
displaying said first and second portions of said spreadsheet object in accordance with said first and second screen designation codes to enable a viewer to contemporaneously view said first and second portions of said spreadsheet object.

20. A computer-usable medium having computer-readable program code embodied therein for causing a computer system to perform a method of displaying spreadsheet objects, said method comprising:
assigning a first screen designation code to a first portion of a spreadsheet object, said first screen designation code associated with a first display screen of a multi-component display;
assigning a second screen designation code to a second portion of said spreadsheet object, said second screen designation code associated with a second display screen of said multi-component display; and
simultaneously displaying said first and second portions of said spreadsheet object in accordance with said first and second screen designation codes, wherein said simultaneously displaying further comprises simultaneously displaying said first and second portions of said spreadsheet object on a respective display screen of said first and second display screens, wherein said simultaneously displaying comprises generating said first and second portions of said spreadsheet object using at least one pixel of said first display screen and at least one pixel of said second display screen.

21. The computer-usable medium of claim 20, wherein said first portion of said spreadsheet object comprises a formula, and wherein said second spreadsheet object comprises at least one of data associated with said formula and a result of said formula.

22. The computer-usable medium of claim 20, wherein said first and second portions of said spreadsheet object comprise adjoining data wrapped from said first display screen to said second display screen.

23. The computer-usable medium of claim 20, wherein said first portion of said spreadsheet object comprises a first color and said second portion of said spreadsheet object comprises a second color.

24. The computer-usable medium of claim 20, wherein said first portion of said spreadsheet object displayed on said first display screen comprises a link to said second portion of said spreadsheet object displayed on said second display screen.

25. The computer-usable medium of claim 20, wherein said method further comprises:
in response to a user interaction, updating a position of said first portion of said spreadsheet object on said first display screen with respect to a position of said second portion of said spreadsheet object on said second display screen.

26. The computer-usable medium of claim 20, wherein said first and second portions of said spreadsheet object are selected from a group consisting of an active cell, an active spreadsheet, and a user-selected cell.

27. The computer-usable medium of claim 20, wherein said method further comprises:
increasing the transparency of said first spreadsheet object to increase the visibility of said second portion of said spreadsheet object.

28. The computer-usable medium of claim 20, wherein said method further comprises:
automatically modifying said second portion of said spreadsheet object in response to a modification of said first portion of said spreadsheet object.

29. The computer-usable medium of claim 20, wherein said first and second portions of said spreadsheet object comprise at least one of a three-dimensional graph, a three-dimensional chart, and a three-dimensional object.

30. A multi-component display comprising:
a first display screen operable to display a first portion of a spreadsheet object in accordance with a first screen designation code assigned to said first portion of said spreadsheet object, wherein said first screen designation code is associated with said first display screen, and wherein said first display screen is operable to display said first portion of said spreadsheet object using at least one pixel of said first display screen;
a second display screen operable to display a second portion of said spreadsheet object in accordance with a second screen designation code assigned to said second portion of said spreadsheet object, wherein said second screen designation code is associated with said second display screen, and wherein said second display screen is operable to display said second portion of said spreadsheet object using at least one pixel of said second display screen.

31. The multi-component display of claim 30, wherein said first and second display screens are further operable to display said first and second portions of said spreadsheet object simultaneously.

32. The multi-component display of claim 30, wherein said first and second portions of said spreadsheet object are selected from a group consisting of a window portion, menu portion, a tab portion, an icon portion, a user-modifiable field portion, a cell portion, and a grouping of cells.

33. The multi-component display of claim 30, wherein said first and second portions of said spreadsheet object are each associated with a respective user-selectable tab.

34. The multi-component display of claim 30, wherein said first portion of said spreadsheet object comprises a formula, and wherein said second portion of said spreadsheet object comprises at least one of data associated with said formula and a result of said formula.

35. The multi-component display of claim 30, wherein said first and second portions of said spreadsheet object comprise adjoining data wrapped from said first display screen to said second display screen.

36. The multi-component display of claim 30, wherein said first portion of said spreadsheet object comprises a first color and said second portion of said spreadsheet object comprises a second color.

37. The multi-component display of claim 30, wherein said first portion of said spreadsheet object displayed on said first display screen comprises a link to said second portion of said spreadsheet object displayed on said second display screen.

38. The multi-component display of claim 30, wherein said second portion of said spreadsheet object comprises at least one of an error message related to said first portion of said spreadsheet object and information about said first portion of said spreadsheet object.

39. The multi-component display of claim 30, wherein said first and second display screens are further operable to update relative positions of said first and second portions of said spreadsheet object in response to a user interaction.

40. The multi-component display of claim 30, wherein at least one of said first and second portions of said spreadsheet object comprise an active cell, an active spreadsheet, and a user-selected cell.

41. The multi-component display of claim 30, wherein said first and second display screens are physically spaced apart from one another, and wherein said first display screen is positioned in front of said second display screen.

42. The multi-component display of claim 30, wherein said first and second display screens are further operable to vary the transparency of a respective portion of said spreadsheet object displayed thereon to change the visibility of a portion of said spreadsheet object selected from a group consisting of said first and second portions of said spreadsheet object.

43. The multi-component display of claim 30, wherein said first portion of said spreadsheet object is associated with a first spreadsheet and said second portion of said spreadsheet object is associated with a second spreadsheet, and wherein said first and second spreadsheets overlap.

* * * * *